(12) United States Patent
Jo et al.

(10) Patent No.: US 11,347,110 B2
(45) Date of Patent: May 31, 2022

(54) COMPOSITION FOR LIQUID CRYSTAL ALIGNMENT AGENT, MANUFACTURING METHOD OF LIQUID CRYSTAL ALIGNMENT FILM, LIQUID CRYSTAL ALIGNMENT FILM USING THE SAME AND LIQUID CRYSTAL DISPLAY DEVICE

(71) Applicant: LG CHEM, LTD., Seoul (KR)

(72) Inventors: Jung Ho Jo, Daejeon (KR); Hee Han, Daejeon (KR); Hang Ah Park, Daejeon (KR); Soon Ho Kwon, Daejeon (KR); Jun Young Yoon, Daejeon (KR); Hyeong Seuk Yun, Daejeon (KR)

(73) Assignee: LG CHEM, LTD, Seoul (KR)

( * ) Notice: Subject to any disclaimer, the term of this patent is extended or adjusted under 35 U.S.C. 154(b) by 292 days.

(21) Appl. No.: 15/765,434

(22) PCT Filed: Apr. 21, 2017

(86) PCT No.: PCT/KR2017/004301
§ 371 (c)(1),
(2) Date: Apr. 2, 2018

(87) PCT Pub. No.: WO2017/196001
PCT Pub. Date: Nov. 16, 2017

(65) Prior Publication Data
US 2018/0298284 A1  Oct. 18, 2018

(30) Foreign Application Priority Data
May 13, 2016 (KR) .................. 10-2016-0058934

(51) Int. Cl.
*G02F 1/1337* (2006.01)
*C09K 19/52* (2006.01)
*C09K 19/56* (2006.01)

(52) U.S. Cl.
CPC ........ *G02F 1/133723* (2013.01); *C09K 19/52* (2013.01); *G02F 1/133711* (2013.01); *C09K 19/56* (2013.01); *C09K 2323/025* (2020.08); *C09K 2323/027* (2020.08); *G02F 1/133788* (2013.01)

(58) Field of Classification Search
CPC ......... G02F 1/133711; G02F 1/133788; G02F 1/133723; Y10T 428/1018; Y10T 428/1023; C09K 2323/025; C09K 2323/027; C08G 73/10; C08G 73/1042; C08G 59/245
See application file for complete search history.

(56) References Cited

U.S. PATENT DOCUMENTS

| | | |
|---|---|---|
| 4,340,715 A | 7/1982 | Gounder et al. |
| 6,946,169 B1 | 9/2005 | Tanioka et al. |
| 2009/0053430 A1* | 2/2009 | Matsumori ............. C08L 77/06 428/1.25 |
| 2009/0194737 A1* | 8/2009 | Lai ..................... C08G 73/1042 252/299.4 |
| 2010/0060834 A1 | 3/2010 | Fang et al. |
| 2010/0243955 A1 | 9/2010 | Tsai et al. |
| 2012/0172541 A1 | 7/2012 | Dong et al. |
| 2014/0072730 A1 | 3/2014 | Hwang et al. |
| 2016/0244673 A1* | 8/2016 | Kunimi ............. C08G 73/1078 |

FOREIGN PATENT DOCUMENTS

| | | | | |
|---|---|---|---|---|
| CN | 102559206 A | 7/2012 | | |
| CN | 102981314 A | 3/2013 | | |
| CN | 103074075 A | 5/2013 | | |
| CN | 103589438 A | 2/2014 | | |
| CN | 104395820 A | 3/2015 | | |
| CN | 104419430 A | 3/2015 | | |
| CN | 104516151 A | 4/2015 | | |
| CN | 108138051 B | * | 8/2021 | ........ G02F 1/133711 |
| JP | H09-185064 A | 7/1997 | | |
| JP | 4029452 B2 | 1/2008 | | |
| JP | 2013-156613 A | 8/2013 | | |
| JP | 5429236 B2 | 2/2014 | | |
| JP | 5537698 B2 | 7/2014 | | |
| JP | 2015-135393 A | 7/2015 | | |
| JP | 2015-135464 A | 7/2015 | | |
| JP | 2016-033638 A | 3/2016 | | |
| JP | 6790336 B2 | * | 11/2020 | ............. C09K 19/52 |
| KR | 10-2004-0046229 A | 6/2004 | | |
| KR | 10-2009-0010899 A | 1/2009 | | |
| KR | 10-0939628 B1 | 1/2010 | | |
| KR | 10-2011-0054842 A | 5/2011 | | |
| KR | 10-2014-0032883 A | 3/2014 | | |
| KR | 10-1454922 B1 | 10/2014 | | |
| KR | 10-2015-0001826 A | 1/2015 | | |
| KR | 10-1486083 B1 | 1/2015 | | |
| KR | 10-2015-0037576 A | 4/2015 | | |

(Continued)

OTHER PUBLICATIONS

Search Report and Written Opinion issued for International Application No. PCT/KR2017/004301 dated Aug. 2, 2017, 14 pages.

*Primary Examiner* — Sophie Hon
(74) *Attorney, Agent, or Firm* — Rothwell, Figg, Ernst & Manbeck, P.C.

(57) ABSTRACT

Provided are a composition for a liquid crystal alignment agent, a manufacturing method of a liquid crystal alignment film, a liquid crystal alignment film using the same, and a liquid crystal display device including the liquid crystal alignment film. More specifically, there are provided the manufacturing method of a liquid crystal alignment film capable of providing the liquid crystal alignment film in which light irradiation energy is able to be reduced, and alignment characteristic and stability are excellent and the voltage holding ratio and electrical characteristics are also excellent through a simple process including applying and drying the composition for a liquid crystal alignment agent on the substrate, directly performing light irradiation to conduct alignment treatment while a high-temperature heat treatment process is omitted, followed by curing by heat treatment, the liquid crystal alignment film, and the liquid crystal display device including the same.

8 Claims, No Drawings

(56) References Cited

FOREIGN PATENT DOCUMENTS

| KR | 10-2015-0137083 A | 12/2015 | | |
|---|---|---|---|---|
| KR | 10-2016-0005644 A | 1/2016 | | |
| KR | 10-2017-0055418 A | 5/2017 | | |
| KR | 101856725 B1 * | 5/2018 | ............ | C09K 19/52 |
| TW | 201035171 A | 10/2010 | | |
| TW | 201300438 A | 1/2013 | | |
| WO | 2011-136371 A1 | 11/2011 | | |
| WO | 2013-047693 A1 | 4/2013 | | |
| WO | 2013-147083 A1 | 10/2013 | | |
| WO | 2015-152174 A1 | 10/2015 | | |

* cited by examiner

COMPOSITION FOR LIQUID CRYSTAL ALIGNMENT AGENT, MANUFACTURING METHOD OF LIQUID CRYSTAL ALIGNMENT FILM, LIQUID CRYSTAL ALIGNMENT FILM USING THE SAME AND LIQUID CRYSTAL DISPLAY DEVICE

CROSS-REFERENCE TO RELATED APPLICATION

This application is a 35 U.S.C. 371 National Phase Entry Application from PCT/KR2017/004301, filed Apr. 21, 2017, which claims priority to and the benefit of Korean Patent Application No. 10-2016-0058934 filed in the Korean Intellectual Property Office on May 13, 2016, the entire contents of which are incorporated herein by reference.

TECHNICAL FIELD

The present invention relates to a composition for a liquid crystal alignment agent in which alignment characteristic and stability are excellent, and electrical characteristics such as voltage holding ratio are enhanced, a manufacturing method of a liquid crystal alignment film, a liquid crystal alignment film using the same, and a liquid crystal display device.

BACKGROUND ART

In a liquid crystal display device, a liquid crystal alignment film serves to align liquid crystals in a predetermined direction. Specifically, the liquid crystal alignment film serves as a director of arrangement of liquid crystal molecules to form a proper direction when an image is formed by moving the liquid crystals due to an electric field. In general, it is essential to uniformly align the liquid crystals to obtain a uniform brightness and a high contrast ratio in the liquid crystal display device.

As a conventional method of aligning the liquid crystals, a rubbing method of applying a polymer film such as a polyimide to a substrate such as a glass, or the like, and rubbing a surface thereof using a fiber such as nylon or polyester in a predetermined direction has been used. However, the rubbing method may cause fine dust or electrical discharge (ESD) when friction occurs between the fiber and the polymer film, which may cause serious problems in manufacturing a liquid crystal panel.

In order to solve the problems of the rubbing method, recently, a light alignment method for inducing anisotropy in a polymer film by light irradiation instead of friction and arranging liquid crystals using the anisotropy has been studied.

Various materials have been introduced as materials that are usable in the above-described light alignment method. Among them, polyimide has been mainly used for good general performance of a liquid crystal alignment film. However, polyimide is generally difficult to be directly applied to a manufacturing process for forming the alignment film by coating in a solution state since solvent solubility is poor. Accordingly, a precursor form such as a polyamic acid or a polyamic acid ester having excellent solubility is coated, followed by a heat treatment at a high temperature to form a polyimide, and then, the polyimide is subjected to light irradiation to conduct alignment treatment. However, in order to obtain a sufficient liquid crystal alignment characteristic by performing light irradiation on a film having such a polyimide state, there is a difficulty in securing actual productivity since a large amount of energy is required, and an additional heat treatment process is required to secure alignment stability after light irradiation.

DISCLOSURE

Technical Problem

The present invention has been made in an effort to provide a composition for a liquid crystal alignment agent having advantages of excellent alignment characteristic and stability, and enhanced electrical characteristics such as voltage holding ratio.

In addition, the present invention has been made in an effort to provide a manufacturing method of a liquid crystal alignment film using the composition for a liquid crystal alignment agent.

Further, the present invention has been made in an effort to provide a liquid crystal alignment film manufactured by the manufacturing method of the liquid crystal alignment film, and a liquid crystal display device including the liquid crystal alignment film.

Technical Solution

An exemplary embodiment of the present invention provides a composition for a liquid crystal alignment agent including: a first polymer for a liquid crystal alignment agent including at least one repeating unit selected from the group consisting of a repeating unit represented by Chemical Formula 2 below and a repeating unit represented by Chemical Formula 3 below, and a repeating unit represented by Chemical Formula 1 below, and a second polymer for a liquid crystal alignment agent including a repeating unit represented by Chemical Formula 4 below.

In addition, another exemplary embodiment of the present invention provides a manufacturing method of a liquid crystal alignment film including: applying the composition for a liquid crystal alignment agent as described above to a substrate to form a coating film;
drying the coating film;
performing light irradiation on the coating film immediately after the drying to conduct alignment treatment; and
curing the coating film on which the alignment treatment is performed, by a heat treatment.

Yet another embodiment of the present invention provides a liquid crystal alignment film manufactured by the manufacturing method of the liquid crystal alignment film.

Yet another embodiment of the present invention provides a liquid crystal display device including the liquid crystal alignment film.

Hereinafter, a composition for a liquid crystal alignment agent, a manufacturing method of a liquid crystal alignment film, a liquid crystal alignment film, and a liquid crystal display device according to exemplary embodiments of the present invention will be described in detail.

According to an embodiment of the present invention, a composition for a liquid crystal alignment agent may include: a first polymer for a liquid crystal alignment agent including at least one repeating unit selected from the group consisting of a repeating unit represented by Chemical Formula 2 below and a repeating unit represented by Chemical Formula 3 below, and a repeating unit represented by Chemical Formula 1 below, and a second polymer for a liquid crystal alignment agent including a repeating unit represented by Chemical Formula 4 below:

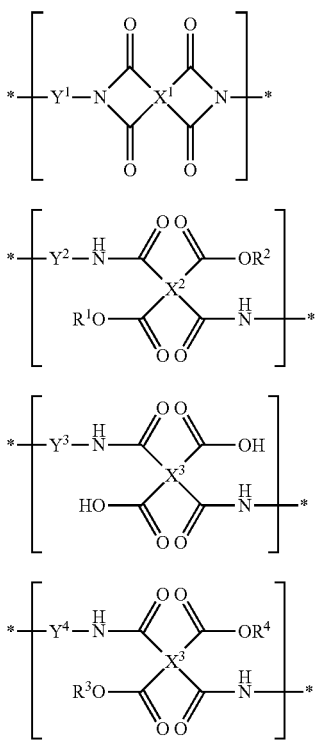

[Chemical Formula 1]

[Chemical Formula 2]

[Chemical Formula 3]

[Chemical Formula 4]

in Chemical Formulas 1 to 4, $R^1$ and $R^2$ are each independently hydrogen or a C1-C10 alkyl group, and not both of $R^1$ and $R^2$ are hydrogen, $R^3$ and $R^4$ are each independently hydrogen or a C1-C10 alkyl group, $X^1$ is a quadrivalent organic group represented by Chemical Formula 5 below,

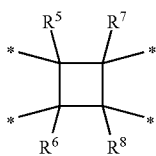

[Chemical Formula 5]

$R^5$ to $R^8$ are each independently hydrogen or a C1-C6 alkyl group, $X^2$ to $X^4$ are each independently a quadrivalent organic group derived from C4-C20 hydrocarbon, or a quadrivalent organic group in which at least one H is substituted with halogen or at least one —$CH_2$— is replaced with —O—, —CO—, —S—, —SO—, —$SO_2$— or —CONH— so that oxygen or sulfur atoms are not directly connected, in the quadrivalent organic group, and $Y^1$ to $Y^4$ are each independently a bivalent organic group.

According to the related art, when a polyimide is used as a liquid crystal alignment film, a polyimide precursor, a polyamic acid or a polyamic acid ester having excellent solubility is applied and dried to form a coating film. Then, the coating film is converted into the polyimide through a heat treatment process at a high temperature, and light irradiation is performed thereon to conduct alignment treatment. However, in order to obtain a sufficient liquid crystal alignment characteristic by performing light irradiation on the film having such a polyimide state, a large amount of light irradiation energy is required, and an additional heat treatment process is required to secure alignment stability after light irradiation. Since the large amount of energy and the additional high-temperature heat treatment process are very disadvantageous in view of the process cost and the processing time, there is a limitation in being actually applied to a mass production process.

Accordingly, the present inventors found through experiments that when the first polymer for a liquid crystal alignment agent essentially including the repeating unit represented by Chemical Formula 1, and additionally including at least one repeating unit selected from the group consisting of the repeating unit represented by Chemical Formula 2 and the repeating unit represented by Chemical Formula 3, was mixed with the second polymer for a liquid crystal alignment agent including the repeating unit represented by Chemical Formula 4 to be used, since the first polymer included a predetermined content of the imide repeating units that are already imidized, a coating film was formed, and light irradiation was directly performed on the coating film without requiring a high temperature heat treatment process to generate anisotropy, and then, heat treatment was performed to complete an alignment film. Thus, a light irradiation energy could be significantly reduced, and a liquid crystal alignment film having excellent alignment characteristic and stability, excellent voltage holding ratio, and excellent electrical characteristics could be manufactured even by a simple process including one heat treatment process, and completed the present invention.

The following terms may be defined as follows, unless otherwise specified in the present specification.

The C4-C20 hydrocarbon may be C4-C20 alkane, C4-C20 alkene, C4-C20 alkyne, C4-C20 cycloalkane, C4-C20 cycloalkene, C4-C20 arene, or at least one cyclic hydrocarbon among them may be a fused ring sharing two or more atoms, or at least one hydrocarbon among them may be chemically bonded hydrocarbon. Specific examples of the C4-C20 hydrocarbon may include n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene or 1,6-diphenylhexane, and the like.

The C1-C10 alkyl group may be a linear alkyl group, or a branched alkyl group, or a cyclic alkyl group. Specifically, the C1-C10 alkyl group may be a C1-C10 linear alkyl group; a C1-05 linear alkyl group; a C3-C10 branched or cyclic alkyl group; or a C3-C6 branched or cyclic alkyl group. More specifically, examples of the C1-C10 alkyl group may include a methyl group, an ethyl group, an n-propyl group, an isopropyl group, an n-butyl group, an iso-butyl group, a tert-butyl group, an n-pentyl group, an iso-pentyl group, a neo-pentyl group, a cyclohexyl group, etc.

The C1-C10 alkoxy group may be a linear alkoxy group, or a branched alkoxy group, or a cyclic alkoxy group. Specifically, the C1-C10 alkoxy group may be a C1-C10 linear alkoxy group; a C1-C5 linear alkoxy group; a C3-C10 branched or cyclic alkoxy group; or a C3-C6 branched or cyclic alkoxy group. More specifically, examples of the C1-C10 alkoxy group may include a methoxy group, an ethoxy group, an n-propoxy group, an iso-propoxy group, an n-butoxy group, an iso-butoxy group, a tert-butoxy group, an n-pentoxy group, an iso-pentoxy group, a neo-pentoxy group, a cyclohexoxy group, etc.

The C1-C10 fluoroalkyl group may be obtained by substituting at least one hydrogen of the C1-C10 alkyl group with fluorine, and the C1-C10 fluoroalkoxy group may be obtained by substituting at least one hydrogen of the C1-C10 alkoxy group with fluorine.

The C2-C10 alkenyl group may be a linear alkenyl group, or a branched alkenyl group, or a cyclic alkenyl group. Specifically, the C2-C10 alkenyl group may be a C2-C10 linear alkenyl group, a C2-C5 linear alkenyl group, a C3-C10 branched alkenyl group, a C3-C6 branched alkenyl group, a C5-C10 cyclic alkenyl group, or a C6-C8 cyclic alkenyl group. More specifically, examples of the C2-C10 alkenyl group may include an ethenyl group, a propenyl group, a butenyl group, a pentenyl group, a cyclohexenyl group, etc.

The halogen may be fluorine (F), chlorine (Cl), bromine (Br) or iodine (I).

A multivalent organic group derived from any compound means a residue from which a plurality of hydrogen atoms bonded to the any compound are removed. As an example, the quadrivalent organic group derived from cyclobutane means a residue from which any four hydrogen atoms bonded to the cyclobutane are removed. In the present specification, in the chemical formulas, -* means a residue from which hydrogen of the corresponding part is removed.

For example,

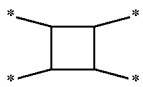

means any one of the residues in which four hydrogen atoms bonded to carbons at C1, C2, C3 and C4 positions are removed, that is, quadrivalent organic groups derived from cyclobutane.

More specifically, in Chemical Formulas 1 to 4, $Y^1$ to $Y^4$ may be each independently a bivalent organic group represented by Chemical Formula 6 below:

[Chemical Formula 6]

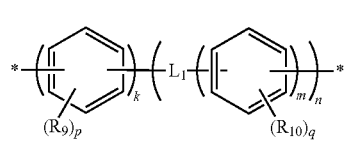

in Chemical Formula 6, $R^9$ and $R^{19}$ are each independently halogen, a cyano group, a C1-C3 alkyl group, a C2-C3 alkenyl group, a C1-C3 alkoxy group, a C1-C3 fluoroalkyl group or a C1-C3 fluoroalkoxy group, p and q are each independently an integer of 0 to 4, $L_1$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O(CH$_2$)$_z$O—, —O(CH$_2$)$_z$—, —NH—, —NH(CH$_2$)$_z$—NH—, —NH(CH$_2$)$_z$O—, —OCH$_2$—C(CH$_3$)$_2$—CH$_2$O—, —OCO—(CH$_2$)$_z$—OCO— or —OCO—(CH$_2$)$_z$—COO—, z is an integer of 1 to 10, k and m are each independently an integer of 1 to 3, and n is an integer of 0 to 3.

In Chemical Formula 6, hydrogen may bonded to the carbon which is not substituted with $R^9$ or $R^{10}$, and when p or q is an integer of 2 to 4, a plurality of $R^9$ or $R^{10}$ may be substituent groups that are the same as or different from each other. In addition, in Chemical Formula 6, n may be an integer of 0 to 3 or an integer of 0 or 1.

Further, in the repeating units represented by Chemical Formulas 1 to 4, $X^1$ may be the quadrivalent organic group represented by Chemical Formula 5, $X^2$ to $X^4$ may be each independently the quadrivalent organic group derived from C4-C20 hydrocarbon, or the quadrivalent organic group in which at least one H is substituted with halogen or at least one —CH$_2$— is replaced with —O—, —CO—, —S—, —SO—, —SO$_2$— or —CONH— so that oxygen or sulfur atoms are not directly connected, in the quadrivalent organic group.

For example, $X^2$ to $X^4$ may be each independently a quadrivalent organic group described in Chemical Formula 7 below:

[Chemical Formula 7]

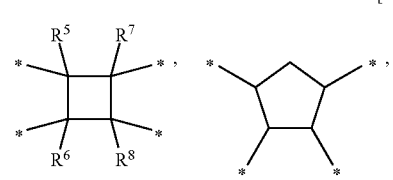

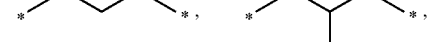

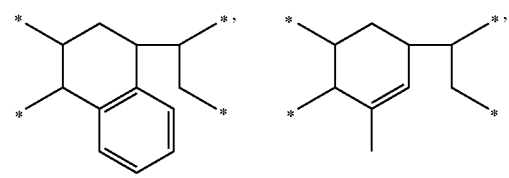

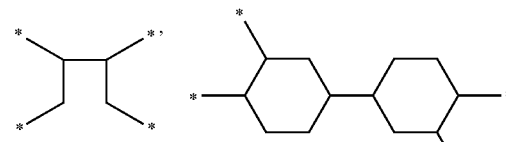

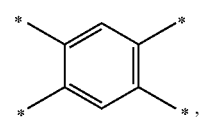

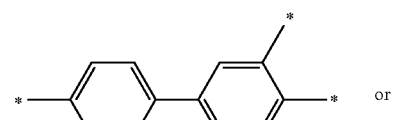

or

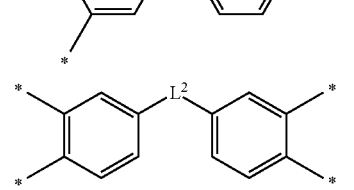

in Chemical Formula 7, $R^5$ to $R^8$ are each independently hydrogen or a C1-C6 alkyl group, $L^2$ is any one selected from the group consisting of a single bond, —O—, —CO—, —S—, —SO—, —SO$_2$—, —CR$^{11}$R$^{12}$—, —CONH—, —COO—, —(CH$_2$)$_z$—, —O(CH$_2$)$_z$O—, —COO—(CH$_2$)$_z$—OCO—, phenylene, and a combination thereof, $R^{11}$ and $R^{12}$ are each independently hydrogen, a C1-C10 alkyl group or a C1-C10 fluoroalkyl group, and z is an integer of 1 to 10.

In addition, the first polymer for a liquid crystal alignment agent used in the manufacturing method of the liquid crystal alignment film according to the embodiment of the present invention may include the repeating unit represented by Chemical Formula 1 which is the imide repeating unit in a content of 10 mol % to 74 mol %, preferably, 20 mol % to 60 mol % with respect to the total repeating units including the repeating units represented by Chemical Formulas 1, 2, and 3.

As described above, when the first polymer for a liquid crystal alignment agent including the specific content of the imide repeating unit represented by Chemical Formula 1 is used, since the polymer includes the predetermined content of the imide repeating unit that is already imidized, it is possible to manufacture the liquid crystal alignment film having excellent alignment characteristic and stability, and excellent voltage holding ratio and electrical characteristics even by directly performing light irradiation while the high temperature heat treatment process is omitted.

When the content of the repeating unit represented by Chemical Formula 1 is less than the above-described content range, sufficient alignment characteristic may not be exhibited and the alignment stability may be deteriorated. When the content of the repeating unit represented by Chemical Formula 1 is more than the above-described content range, solubility may be lowered, which may cause a difficulty in manufacturing a stable alignment liquid that is able to be coated. Accordingly, it is preferred to include the repeating unit represented by Chemical Formula 1 within the above-described content range since it is possible to provide a polymer for a liquid crystal alignment agent in which all of storage stability, electrical characteristics, alignment characteristic, and alignment stability are excellent.

Further, the first polymer for a liquid crystal alignment agent may include the repeating unit represented by Chemical Formula 2 or the repeating unit represented by Chemical Formula 3 in an appropriate content depending on desired characteristics.

Specifically, the repeating unit represented by Chemical Formula 2 may have a content of 0 mol % to 40 mol %, preferably 0 mol % to 30 mol %, with respect to the total repeating units represented by Chemical Formulas 1 to 3. A ratio at which the repeating unit represented by Chemical Formula 2 is converted to imide during the high-temperature heat treatment process after light irradiation is low, and thus, when the content thereof is more than the above-described range, an overall imidization rate may not be sufficient, and the alignment stability may be deteriorated. Accordingly, the repeating unit represented by Chemical Formula 2 may exhibit an appropriate solubility within the above-described range, thereby providing the polymer for a liquid crystal alignment agent capable of implementing a high imidization rate and having excellent process characteristics.

Further, the repeating unit represented by Chemical Formula 3 may have a content of 0 mol % to 95 mol %, preferably 10 mol % to 90 mol %, with respect to the total repeating units represented by Chemical Formulas 1 to 3. Within the above-described range, the repeating unit represented by Chemical Formula 3 may exhibit excellent coating property, thereby providing the polymer for a liquid crystal alignment agent capable of implementing a high imidization rate and having excellent process characteristics.

Meanwhile, the second polymer for a liquid crystal alignment agent used in the manufacturing method of the liquid crystal alignment film of the embodiment is mixed with the first polymer for a liquid crystal alignment agent, which is a partially imidized polymer, and used as a liquid crystal alignment agent, and thus, electrical characteristics of the alignment film such as the voltage holding ratio may be greatly improved as compared to when the first polymer for a liquid crystal alignment agent is only used.

In order to exhibit this effect, it is preferred to derive $X^4$ in the repeating unit represented by Chemical Formula 4 from an aromatic structure in view of improvement of the voltage holding ratio.

Further, in the repeating unit represented by Chemical Formula 4, $Y^4$ is preferably a bivalent organic group represented by Chemical Formula 6, wherein more preferably, $R^9$ and $R^{10}$ are each independently a short-chain functional group having 3 or less carbon atoms, or $R^9$ and $R^{10}$ do not have a branched structure (p and q are 0).

In addition, the first polymer for a liquid crystal alignment agent and the second polymer for a liquid crystal alignment agent may be mixed at a weight ratio of about 15:85 to 85:15, preferably, about 20:80 to 80:20. As described above, the first polymer for a liquid crystal alignment agent is characterized by directly performing light irradiation to generate anisotropy without requiring a high temperature heat treatment process after the coating film is formed, and then performing heat treatment to complete the alignment film since the first polymer for a liquid crystal alignment agent includes a predetermined amount of the imide repeating units that are already imidized, and the second polymer for a liquid crystal alignment agent is characterized by improving electrical characteristics such as voltage holding ratio. When the first polymer for a liquid crystal alignment agent and the second polymer for a liquid crystal alignment agent having such characteristics are mixed and used in the above-described weight ratio range, the first polymer for a liquid crystal alignment agent having excellent light reaction characteristic and liquid crystal alignment characteristic, and the second polymer for a liquid crystal alignment agent having excellent electrical characteristics may be complemented with each other, and thus, it is possible to manufacture a liquid crystal alignment film having more excellent alignment characteristic and electrical characteristics at the same time.

According to another embodiment of the present invention, a manufacturing method of a liquid crystal alignment film includes: applying the composition for a liquid crystal alignment agent according to an embodiment of the present invention to a substrate to form a coating film;

drying the coating film;

performing a light irradiation on the coating film immediately after the drying to conduct alignment treatment; and curing the coating film on which the alignment treatment is performed, by a heat treatment.

In the manufacturing method of the liquid crystal alignment film, the coating film is formed by applying the composition for a liquid crystal alignment agent to a substrate, the composition for a liquid crystal alignment agent including the first polymer for a liquid crystal alignment agent including at least one repeating unit selected from the group consisting of the repeating unit represented by Chemical Formula 2 and the repeating unit represented by Chemical Formula 3, and the repeating unit represented by Chemical Formula 1, and the second polymer for a liquid crystal alignment agent including the repeating unit represented by Chemical Formula 4 according to the embodiment of the present invention. The method of applying the composition for a liquid crystal alignment agent to the substrate is not particularly limited, and for example, may include screen printing, offset printing, flexo printing, ink jet, etc.

Further, the composition for a liquid crystal alignment agent may be obtained by dissolving or dispersing the first polymer for a liquid crystal alignment agent and the second polymer for a liquid crystal alignment agent in an organic solvent.

Specific examples of the organic solvent may include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 3-methoxy-N,N-dime thylpropanamide, 3-ethoxy-N,N-dimethylpropanamide, 3-butoxy-N,N-dimethylpropanamide, 1,3-dimethyl-imidazolidinone, ethylamylketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, etc. These organic solvents may be used alone or in combination.

In addition, the composition for a liquid crystal alignment agent may further include other components in addition to the polymer for a liquid crystal alignment agent and the organic solvent. As a non-limiting example, additives that are able to improve uniformity of a film thickness or surface smoothness, or to improve adhesiveness between the light alignment film and the substrate, or to change a dielectric constant or conductivity of the light alignment film, or to increase denseness of the light alignment film when the composition for a liquid crystal alignment agent is applied, may be further included. Examples of the additive may include various solvents, surfactants, silane-based compounds, dielectrics, crosslinking compounds, etc.

Next, the coating film formed by applying the composition for a liquid crystal alignment agent to the substrate is dried. The step of drying the coating film may be performed by heating, vacuum evaporation, etc., and is preferably performed at 50° C. to 150° C., or 60° C. to 140° C.

Next, in the manufacturing method of the liquid crystal alignment film of the embodiment, the alignment treatment is performed by performing light irradiation on the coating film immediately after the drying step. In the present specification, the description "the coating film immediately after the drying step" means that the coating film is subjected to light irradiation directly after the drying step without proceeding to the heat treatment at a temperature of the drying step or higher, and other steps other than the heat treatment may be added thereto.

More specifically, when the liquid crystal alignment film is manufactured by using the liquid crystal alignment agent including a polyamic acid or a polyamic acid ester according to the related art, the heat treatment at a high temperature is essentially performed for imidization of the polyamic acid or the polyamic acid ester, and then, light irradiation is performed. However, when the liquid crystal alignment film is manufactured by using the liquid crystal alignment agent according to the embodiment of the present invention as described above, it is possible to manufacture the liquid crystal alignment film in which alignment characteristic and stability are sufficiently enhanced even under small light irradiation energy by directly performing light irradiation to conduct alignment treatment without including the above-described heat treatment step, and then, curing the coating film on which the alignment treatment is performed, by heat treatment.

In addition, the light irradiation in the alignment treatment may be performed with polarized ultraviolet ray having a wavelength of 150 nm to 450 nm. Here, an intensity of the exposure may vary depending on the kind of the polymer, and the energy of 10 mJ/cm$^2$ to 10 J/cm$^2$, preferably, 30 mJ/cm$^2$ to 2 J/cm$^2$ may be irradiated.

As the UV, a polarization UV selected from polarization-treated UV by methods in which the UV is passed or reflected through ① polarizing devices using substrates in which a material having dielectric anisotropy is coated onto a surface of transparent substrates such as quartz glass, soda lime glass, soda lime free glass, etc., ② polarizing plates in which aluminum or metal wires are finely deposited, or ③ a Brewster polarizing device, etc., by reflection of quartz glass, may be irradiated to conduct alignment treatment. Here, the polarized ultraviolet ray may be irradiated perpendicularly to a substrate surface, or may be irradiated by inclining an incident angle at a specific angle. Due to the method, the coating film has an ability in which liquid crystal molecules are aligned.

Next, the manufacturing method may include a step of curing the coating film on which the alignment treatment is performed, by heat treatment. The step of curing the coating film on which the alignment treatment is performed, by heat treatment, is a step which is performed after the light irradiation in the manufacturing method of the liquid crystal alignment film by using the polymer for a liquid crystal alignment agent including a polyamic acid or a polyamic acid ester according to the related art, which is differentiated from a heat treatment step which is performed to imidize the composition for a liquid crystal alignment agent before the light irradiation or during the light irradiation after the composition for a liquid crystal alignment agent is applied to a substrate.

Here, the heat treatment may be performed by a heating means such as a hot plate, a hot air circulation path, an infrared ray furnace, or the like, and is preferably performed at 150° C. to 300° C., or 200° C. to 250° C.

Further, according to still another embodiment of the present invention, there may be provided a liquid crystal alignment film manufactured by the manufacturing method of the liquid crystal alignment film according to the embodiment of the present invention.

As described above, when the first polymer for a liquid crystal alignment agent essentially including the repeating unit represented by Chemical Formula 1, and including at least one repeating unit selected from the group consisting of the repeating unit represented by Chemical Formula 2 and the repeating unit represented by Chemical Formula 3 is mixed with the second polymer for a liquid crystal alignment agent including the repeating unit represented by Chemical Formula 4 to be used, it is possible to manufacture the liquid crystal alignment film having enhanced alignment characteristic and stability.

Further, according to still another embodiment of the present invention, there may be provided a liquid crystal display device including the liquid crystal alignment film as described above.

The liquid crystal alignment film may be introduced into the liquid crystal cell by a known method, and the liquid crystal cell may be introduced into the liquid crystal display device by a known method. The liquid crystal alignment film may be manufactured by mixing the polymer essentially including the repeating unit represented by Chemical Formula 1 and the polymer including the repeating unit represented by Chemical Formula 4, thereby implementing excellent stability together with excellent general physical properties. Accordingly, a liquid crystal display device capable of exhibiting high reliability may be provided.

Advantageous Effects

According to the present invention, there are provided the composition for a liquid crystal alignment agent capable of providing the liquid crystal alignment film in which light irradiation energy is able to be reduced, and alignment characteristic and stability are excellent and the voltage holding ratio and electrical characteristics are also excellent through a simple process including applying and drying the composition for a liquid crystal alignment agent on the substrate, directly performing light irradiation for alignment treatment while the high-temperature heat treatment process is omitted, followed by curing by heat treatment, and the manufacturing method of the liquid crystal alignment film.

MODE FOR INVENTION

The present invention will be described in more detail in the following Examples. However, the following Examples are provided only to illustrate the present invention, and accordingly, the present invention is not limited to the following Examples.

Preparation Example 1: Synthesis of Diamine Da-1

Diamine DA-1 was synthesized according to Reaction Scheme 1 below:

[Reaction Scheme 1]

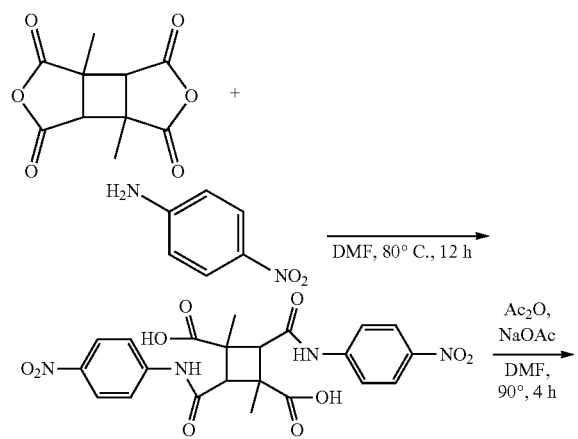

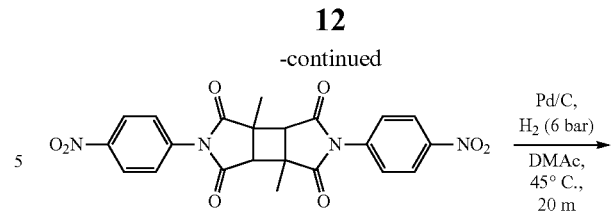

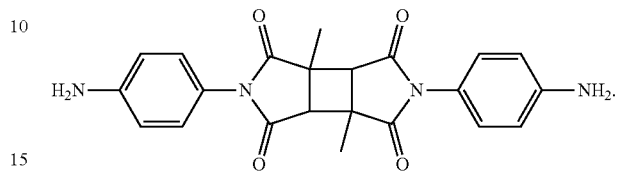

1,3-dimethylcyclobutane-1,2,3,4-tetracarboxylic dianhydride (DMCBDA) and 4-nitroaniline were dissolved in dimethylformamide (DMF) to prepare a mixture. Then, the mixture was reacted at about 80° C. for about 12 hours to prepare an amic aid. Then, the amic acid was dissolved in DMF, and acetic anhydride and sodium acetate were added thereto, thereby preparing a mixture. Then, the amic acid included in the mixture was imidized at about 90° C. for about 4 hours. The thus-obtained imide was dissolved in dimethylacetamide (DMAc), and Pd/C was added thereto, thereby preparing a mixture. The mixture was reduced at 45° C. and under hydrogen pressure of 6 bar for 20 minutes, thereby preparing the diamine DA-1.

Preparation Example 2: Synthesis of Diamine DA-2

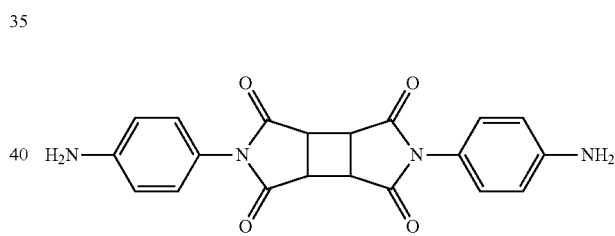

A diamine DA-2 having the above structure was prepared in the same manner as in Preparation Example 1 except that cyclobutane-1,2,3,4-tetracarboxylic dianhydride (CBDA) was used instead of 1,3-dimethylcyclobutane-1,2,3,4-tetracarboxylic dianhydride.

Preparation Example 3: Synthesis of Diamine Da-3

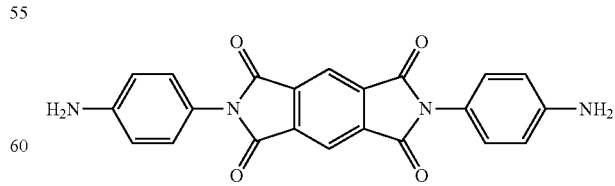

A diamine DA-3 having the above structure was prepared in the same manner as in Preparation Example 1 except that pyromellitic dianhydride (PMDA) was used instead of 1,3-dimethylcyclobutane-1,2,3,4-tetracarboxylic dianhydride.

Preparation Example 4: Synthesis of Diamine DA-4

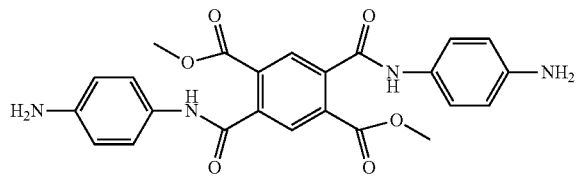 [SMILES: COC(=O)c1cc(C(=O)Nc2ccc(N)cc2)c(C(=O)OC)cc1C(=O)Nc1ccc(N)cc1]

The diamine DA-4 was synthesized according to Reaction Scheme 2 below:

[Reaction Scheme 2]

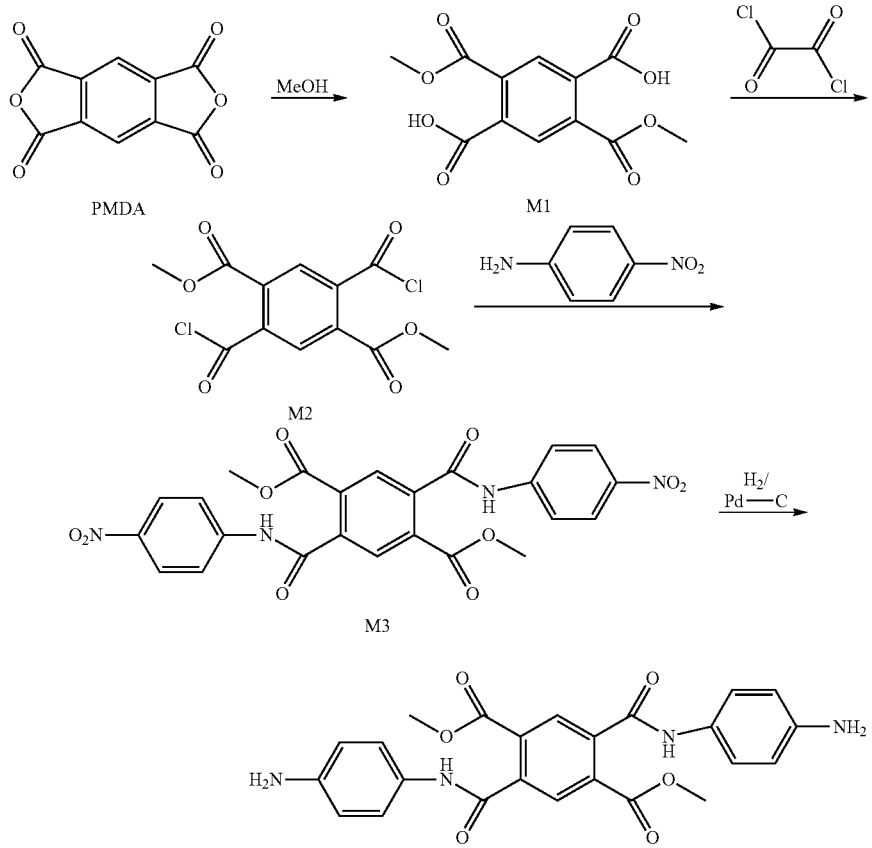

25 g of pyromellitic dianhydride (PMDA) was added to 250 mL of methanol, 1 or 2 drops of hydrochloric acid was added thereto, and the mixture was heated under reflux at 75° C. for 5 hours. The solvent was removed under reduced pressure, and 300 mL of ethyl acetate and normal hexane were added to solidify the mixture. The resulting solid was filtered under reduced pressure and dried under reduced pressure at 40° C. to obtain 32 g of M1.

100 mL of toluene was added to 34 g of the obtained M1, and 35 g of oxalyl chloride was added dropwise at room temperature. Two or three drops of dimethylformamide (DMF) were added dropwise and the mixture was stirred at 50° C. for 16 hours. The mixture was cooled to room temperature, and the solvent and residual oxalyl chloride were removed under reduced pressure. 300 mL of normal hexane was added to the yellow solid product, and the mixture was heated to 80° C. under reflux. The heated reaction solution was filtered to remove impurity that was not soluble in n-hexane. The resultant solution was slowly cooled up to room temperature to obtain white crystals, the white crystals were filtered and dried in a oven under reduced pressure at 40° C. to obtain 32.6 g of M2.

29.6 g of 4-nitroaniline and 21.7 g of triethanolamine (TEA) were added to 400 mL of tetrahydrofuran (THF) and 32.6 g of M2 was added at room temperature. The mixture was stirred at room temperature for 16 hours to obtain a precipitate, and the precipitate was filtered. 400 mL of dichloromethane was added to the filtrate, and the mixture was washed with 0.1N hydrochloric acid, and then washed with a saturated aqueous sodium bicarbonate ($NaHCO_3$) solution again. The washed organic solution was filtered under reduced pressure to obtain a solid product, and the solid product was recrystallized with dichloromethane to obtain 43 g of a solid dinitro compound M3.

43 g of the obtained dinitro compound M3 was placed in a high-pressure reactor and dissolved in 500 mL of THF. 2.2 g of 10 wt % Pd—C was added thereto and stirred at room temperature for 16 hours under hydrogen gas ($H_2$) at 3 atm. After the reaction, Pd—C was removed by filtration through celite filter, and the filtrate was concentrated under reduced pressure to obtain 37 g of esterified diamine DA-4.

Preparation Example 5: Synthesis of Diamine DA-5

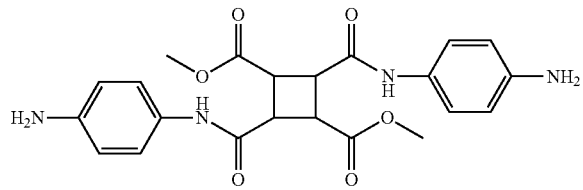 [SMILES: COC(=O)C1C(C(=O)Nc2ccc(N)cc2)C(C(=O)OC)C1C(=O)Nc1ccc(N)cc1]

DA-5 having the above-described structure was prepared in the same manner as in Preparation Example 4 except that cyclobutane-1,2,3,4-tetracarboxylic dianhydride (CBDA) was used instead of pyromellitic dianhydride (PMDA).

[Preparation of First Polymer for Liquid Crystal Alignment Agent]

Synthesis Example 1: Preparation of Polymer for Liquid Crystal Alignment Agent P-1

5.0 g (13.3 mmol) of DA-2 prepared in Preparation Example 2 was completely dissolved in 71.27 g of anhydrous N-methyl pyrrolidone (NMP). In addition, 2.92 g (13.03 mmol) of 1,3-dimethyl-cyclobutane-1,2,3,4-tetracarboxylic dianhydride (DMCBDA) was added to the solution under an ice bath, and the mixture was stirred at room temperature for 16 hours. Further, the obtained solution was injected into an excessive amount of distilled water to form a precipitate. Subsequently, the resulting precipitate was filtered, washed twice with distilled water, and washed again with methanol three times. The thus-obtained solid product was dried in an oven under reduced pressure at 40° C. for 24 hours to obtain 6.9 g of a polymer for a liquid crystal alignment agent P-1.

As a result of confirming molecular weights of P-1 through GPC, the number average molecular weight (Mn) was 15,500 g/mol and the weight average molecular weight (Mw) was 31,000 g/mol. The monomer structure of the polymer P-1 was determined by the equivalence ratio of the used monomers, and the polymer P-1 had an imide structure ratio of 50.5% and an amic acid structure ratio of 49.5% in the molecule.

Synthesis Example 2: Preparation of Polymer for Liquid Crystal Alignment Agent P-2

A polymer for a liquid crystal alignment agent P-2 was prepared in the same manner as in Synthesis Example 1 except that 5.0 g of DA-1 and 1.07 g of p-phenylenediamine (PDA) were first dissolved in 103.8 g of NMP, and then, 2.12 g of cyclobutane-1,2,3,4-tetracarboxylic dianhydride (CBDA) and 3.35 g of 4,4'-oxydiphthalic dianhydride (OPDA) were added thereto. As a result of confirming molecular weights of P-2 through GPC, the number average molecular weight (Mn) was 18,000 g/mol and the weight average molecular weight (Mw) was 35,000 g/mol. In addition, the polymer P-2 had an imide structure ratio of 36.4% and an amic acid structure ratio of 63.6% in the molecule.

Synthesis Example 3: Preparation of Polymer for Liquid Crystal Alignment Agent P-3

A polymer for a liquid crystal alignment agent P-3 was prepared in the same manner as in Synthesis Example 1 except that 6.0 g of DA-2 and 1.37 g of 4,4'-oxydianiline (ODA) were first dissolved in 110.5 g of NMP, and then, 3.47 g of DMCBDA and 1.44 g of pyromellitic dianhydride (PMDA) were added thereto. As a result of confirming molecular weights of P-3 through GPC, the number average molecular weight (Mn) was 14,500 g/mol and the weight average molecular weight (Mw) was 29,000 g/mol. In addition, the polymer P-3 had an imide structure ratio of 41.9% and an amic acid structure ratio of 58.1% in the molecule.

Synthesis Example 4: Preparation of Polymer for Liquid Crystal Alignment Agent P-4

A polymer for a liquid crystal alignment agent P-4 was prepared in the same manner as in Synthesis Example 1 except that 5.0 g of DA-1 and 2.8 g of DA-5 were first dissolved in 115.9 g of NMP, and then, 4.08 g of cyclobutane-1,2,3,4-tetracarboxylic dianhydride (CBDA) was added thereto. As a result of confirming molecular weights of P-4 through GPC, the number average molecular weight (Mn) was 17,000 g/mol and the weight average molecular weight (Mw) was 35,000 g/mol. In addition, the polymer P-4 had an imide structure ratio of 35.3%, an amic acid ester structure ratio of 15.1%, and an amic acid structure ratio of 49.5% in the molecule.

Synthesis Example 5: Preparation of Polymer for Liquid Crystal Alignment Agent P-5

A polymer for a liquid crystal alignment agent P-5 was prepared in the same manner as in Synthesis Example 1 except that 5.0 g of DA-1 and 1.89 g of 4,4'-(1,3-propyldiyl) dioxydianiline, and 2.29 g of DA-4 were first dissolved in 131.00 g of NMP, and then, 5.43 g of DMCBDA was added thereto. As a result of confirming molecular weights of P-5 through GPC, the number average molecular weight (Mn) was 19,500 g/mol and the weight average molecular weight (Mw) was 36,000 g/mol. In addition, the polymer P-5 had an imide structure ratio of 29.8%, an amic acid ester structure ratio of 11.9%, and an amic acid structure ratio of 49.5% in the molecule.

Synthesis Example 6: Preparation of Polymer for Liquid Crystal Alignment Agent P-6

3.7 g of 4,4'-oxydianiline (ODA) and 2.0 g of p-phenylene diamine (PDA) were completely dissolved in 124.5 g of anhydrous N-methyl pyrrolidone (NMP). In addition, 8.13 g of 1,3-dimethyl-cyclobutane-1,2,3,4-tetracarboxylic dianhydride (DMCBDA) was added to the mixture under an ice bath, and the mixture was stirred at room temperature for 16 hours, thereby preparing a 100% polyamic acid polymer solution PA-6.

7.4 g of acetic anhydride and 5.7 g of pyridine were added to the thus-prepared PA-6 solution, and the mixture was stirred at 50° C. for 3 hours to perform chemical imidization. Further, the obtained product was injected into an excessive amount of distilled water to form a precipitate. Subsequently, the resulting precipitate was filtered, washed twice with distilled water, and washed again with methanol three times. The thus-obtained solid product was dried in an oven under reduced pressure at 40° C. for 24 hours to obtain a polymer for a liquid crystal alignment agent P-6. As a result of confirming molecular weights of P-6 through GPC, the number average molecular weight (Mn) was 14,500 g/mol and the weight average molecular weight (Mw) was 28,000 g/mol.

Meanwhile, the composition of P-6 was quantitatively analyzed as follows.

The PA-6 solution obtained before the chemical imidization was coated on the glass substrate and was subjected to heat treatment in an oven at 300° C. for 2 hours to perform imidization. The imidization rate of the material obtained through this process was defined as 100%, and C-N peak (1380 cm$^{-1}$) of the P-6 obtained through the chemical imidization process and the imide shown in the IR spectroscope were analyzed by comparison. Specifically, the aromatic peak at 1520 cm$^{-1}$ was set as a reference for normalization, and a magnitude I of the C-N peak at 1380 cm$^{-1}$ of each of PA-6 and P-6 was integrated and substituted into Equation 1 below to quantify the imidization rate.

$$\text{Imidization rate (\%)}=[(I_{1380,P\text{-}6}-I_{1520,P\text{-}6})/(I_{1380,P4\text{-}6@300}-I_{1520,P4\text{-}6@300})]*100 \quad [\text{Equation 1}]$$

In Equation 1, $I_{1380,P\text{-}6}$ indicates a magnitude of C-N peak shown at 1380 cm$^{-1}$ of P-6, $I_{1520,P\text{-}6}$ indicates a magnitude of aromatic peak shown at 1520 cm$^{-1}$ of P-6, $I_{1380,P4\text{-}6@300}$ indicates a magnitude of C-N peak shown at 1380 cm$^{-1}$ of a material in which PA-6 is heat-treated at 300° C., and $I_{1520,P4\text{-}6@300}$ indicates a magnitude of an aromatic peak shown at 1520 cm$^{-1}$ of a material in which PA-6 is heat-treated at 300° C.

As a result of analyzing the composition of P-6 through the above-described method, the polymer P-6 had an amic acid structure ratio of 35% and an imide structure ratio of 65%.

Synthesis Example 7: Preparation of Polymer for Liquid Crystal Alignment Agent P-7

PA-6 was prepared in the same manner as in Synthesis Example 6, except that 13.0 g of acetic anhydride and 11.5 g of pyridine were used.

However, gelation of the reaction solution proceeded during the reaction for 5 hours. The gelled reaction product was stirred in an excessive amount of distilled water to obtain a solid content. The resulting solid was washed twice with an excessive amount of distilled water, three times with methanol, and then dried at 40° C. in an oven under reduced pressure for 24 hours to prepare a polymer P-7. However, the prepared P-7 was inferior in solubility, and thus, a molecular weight thereof could not be measured. As a result of analyzing the composition through the analysis method of Synthesis Example 6, the polymer P-7 had an imide structure ratio of 75.0% and an amic acid structure ratio of 25.0%.

Synthesis Example 8: Preparation of Polymer for Liquid Crystal Alignment Agent P-8

A polymer for a liquid crystal alignment agent P-8 was prepared in the same manner as in Synthesis Example 1 except that 10.0 g of DA-3 was first dissolved in 140.0 g of NMP, and then, 5.52 g of DMCBDA was added thereto. As a result of confirming molecular weights of P-8 through GPC, the number average molecular weight (Mn) was 22,000 g/mol and the weight average molecular weight (Mw) was 39,000 g/mol. In addition, as a result of analyzing the monomer structure of P-8, the polymer P-8 had an imide structure ratio of 50.5% and an amic acid structure ratio of 49.5% in the molecule.

Synthesis Example 9: Preparation of Polymer for Liquid Crystal Alignment Agent P-9

A polymer for a liquid crystal alignment agent P-9 was prepared in the same manner as in Synthesis Example 1 except that 2.0 g of DA-2 and 5.2 g of p-phenylenediamine (PDA) were first dissolved in 170.0 g of NMP, and 11.68 g of 1,3-dimethyl-cyclobutane-1,2,3,4-tetracarboxylic acid dianhydride (DMCBDA) was added thereto. As a result of confirming molecular weights of P-9 through GPC, the number average molecular weight (Mn) was 16,000 g/mol and the weight average molecular weight (Mw) was 28,000 g/mol. In addition, as a result of analyzing the monomer structure of P-9, the polymer P-9 had an imide structure ratio of 9.3% and an amic acid structure ratio of 90.2% in the molecule.

[Preparation of Second Polymer for Liquid Crystal Alignment Agent]

Synthesis Example 10: Preparation of Polymer for Liquid Crystal Alignment Agent Q-1

A polymer for a liquid crystal alignment agent Q-1 was prepared in the same manner as in Synthesis Example 1 except that 5.00 g of 4,4'-methylenedianiline and 5.05 g of 4,4'-oxydianiline were first dissolved in 221.4 g of NMP, and 14.55 g of 4,4'-biphthalic anhydride was added thereto. As a result of confirming molecular weights of Q-1 through GPC, the number average molecular weight (Mn) was 25,000 g/mol and the weight average molecular weight (Mw) was 40,000 g/mol.

Synthesis Example 11: Preparation of Polymer for Liquid Crystal Alignment Agent Q-2

A polymer for a liquid crystal alignment agent Q-2 was prepared in the same manner as in Synthesis Example 1 except that 7.0 g of 4,4'-(1,4-butanediyl)dioxydianiline and 2.19 g of 4,4'-iminodianiline were first dissolved in 178.1 g of NMP, and 10.59 g of 4,4'-biphthalic anhydride was added thereto. As a result of confirming molecular weights of Q-2 through GPC, the number average molecular weight (Mn) was 28,000 g/mol and the weight average molecular weight (Mw) was 45,000 g/mol.

Synthesis Example 12: Preparation of Polymer for Liquid Crystal Alignment Agent Q-3

A polymer for a liquid crystal alignment agent Q-3 was prepared in the same manner as in Synthesis Example 1 except that 10.0 g of 4,4'-(1,3-propyldiy)dioxydianiline was first dissolved in 180.7 g of NMP, and 4.16 g of pyromellitic dianhydride (PMDA) and 5.92 g of 4,4'-oxydiphthalic anhydride were added thereto. As a result of confirming molecular weights of Q-3 through GPC, the number average molecular weight (Mn) was 26,500 g/mol and the weight average molecular weight (Mw) was 43,000 g/mol.

Experimental Example: Evaluation of Characteristics of Liquid Crystal Alignment Film Preparation of Liquid Crystal Alignment Agent and Manufacture of Liquid Crystal Cell (1) Preparation of Liquid Crystal Alignment Agent Example 1

1.0 g of the polymer P-1 obtained in Synthesis Example 1 and 1.0 g of the polymer Q-1 obtained in Synthesis Example 10 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluoroethylene) and having a pore size of 0.2 μm, thereby preparing a liquid crystal alignment agent A-1.

Example 2

1.0 g of the polymer P-1 obtained in Synthesis Example 1 and 1.0 g of the polymer Q-2 obtained in Synthesis Example 11 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluoroethylene) and having a pore size of 0.2 μm, thereby preparing a liquid crystal alignment agent A-2.

Example 3

1.0 g of the polymer P-2 obtained in Synthesis Example 2 and 1.0 g of the polymer Q-2 obtained in Synthesis Example 11 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluoroethylene) and having a pore size of 0.2 μm, thereby preparing a liquid crystal alignment agent A-3.

Example 4

1.2 g of the polymer P-3 obtained in Synthesis Example 3 and 0.8 g of the polymer Q-1 obtained in Synthesis Example 10 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluoroethylene) and having a pore size of 0.2 μm, thereby preparing a liquid crystal alignment agent A-4.

Example 5

1.4 g of the polymer P-4 obtained in Synthesis Example 4 and 0.6 g of the polymer Q-3 obtained in Synthesis Example 12 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluoroethylene) and having a pore size of 0.2 μm, thereby preparing a liquid crystal alignment agent A-5.

Example 6

1.0 g of the polymer P-5 obtained in Synthesis Example 5 and 1.0 g of the polymer Q-3 obtained in Synthesis Example 12 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluoroethylene) and having a pore size of 0.2 μm, thereby preparing a liquid crystal alignment agent A-6.

Example 7

0.4 g of the polymer P-6 obtained in Synthesis Example 6 and 1.6 g of the polymer Q-2 obtained in Synthesis Example 11 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 μm, thereby preparing a liquid crystal alignment agent A-7.

Comparative Example 1

1.0 g of the polymer P-8 obtained in Synthesis Example 8 and 1.0 g of the polymer Q-1 obtained in Synthesis Example 10 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 μm, thereby preparing a liquid crystal alignment agent B-1.

Comparative Example 2

2.0 g of the polymer P-2 obtained in Synthesis Example 2 was dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 μm, thereby preparing a liquid crystal alignment agent B-2.

Comparative Example 3

2.0 g of the polymer Q-1 obtained in Synthesis Example 10 was dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 μm, thereby preparing a liquid crystal alignment agent B-3.

Reference Example 1

1.0 g of the polymer P-7 obtained in Synthesis Example 7 and 1.0 g of the polymer Q-1 obtained in Synthesis Example 10 were attempted to be dissolved in a mixed solvent in which 30 g of NMP and 8 g of n-butoxyethanol were mixed, but the P-7 was not dissolved, and thus, a completely dissolved alignment agent could not be obtained.

Reference Example 2

1.8 g of the polymer P-2 obtained in Synthesis Example 2 and 0.2 g of the polymer Q-3 obtained in Synthesis Example 12 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 μm, thereby preparing a liquid crystal alignment agent C-2.

Reference Example 3

0.2 g of the polymer P-1 obtained in Synthesis Example 1 and 1.8 g of the polymer Q-2 obtained in Synthesis Example 11 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 μm, thereby preparing a liquid crystal alignment agent C-3.

Reference Example 4

1.0 g of the polymer P-9 obtained in Synthesis Example 9 and 1.0 g of the polymer Q-3 obtained in Synthesis Example 12 were dissolved in a mixed solvent in which 30 g of NMP and 8 g of n-butoxyethanol were mixed, thereby obtaining a 5 wt % solution. Then, the obtained solution was pressure-filtered through a filter made of poly(tetrafluorene ethylene) and having a pore size of 0.2 µm, thereby preparing a liquid crystal alignment agent C-4.

(2) Manufacture of Liquid Crystal Cell

A liquid crystal cell was manufactured in the following method using the liquid crystal alignment agents manufactured by Examples 1 to 7, Comparative Examples 1 to 3, and Reference Examples 1 to 4.

The liquid crystal alignment agent was applied onto a substrate (lower plate) in which comb-shaped IPS (in-plane switching) mode typed ITO electrode patterns having a thickness of 60 nm, an electrode width of 3 µm, and an interval between electrodes of 6 µm were formed on a rectangular glass substrate having a size of 2.5 cm×2.7 cm and a glass substrate (upper plate) in which the electrode patterns were not formed, respectively, by using a spin coating method.

Subsequently, the substrates applied with the liquid crystal alignment agent were placed and dried on a hot plate at about 70° C. for 3 minutes to evaporate the solvent. In order to align the thus-obtained coating films, the respective coating films of the upper and lower plates were irradiated with 254 nm ultraviolet rays in an exposure amount of 1.0 J/cm$^2$ using an exposure machine to which a linear polarizer was attached.

Then, the aligned upper and lower plates were fired (cured) in an oven at about 230° C. for 30 minutes to obtain a coating film having a film thickness of 0.1 µm. Then, a sealing agent impregnated with a ball spacer having a size of 3 µm was applied to the edge of the upper plate except for a liquid crystal injection hole. Further, the alignment films formed on the upper plate and the lower plate were arranged so that they opposite each other and alignment directions thereof were parallel to each other, and then the upper and lower plates were bonded together and the sealing agent was cured, thereby manufacturing an empty cell. In addition, the liquid crystal was injected into the empty cell, thereby manufacturing an IPS mode liquid crystal cell.

<Evaluation of Characteristics of Liquid Crystal Alignment Film>

(1) Evaluation of Liquid Crystal Alignment Characteristic

Polarizing plates were attached on the upper and lower plates of the above-manufactured liquid crystal cell to be vertical to each other. Here, a polarizing axis of the polarizing plate attached to the lower plate was parallel to an alignment axis of the liquid crystal cell. Further, the liquid crystal cell to which the polarizing plates were attached was placed on a backlight having a brightness of 7,000 cd/m$^2$, and light leakage was observed with the naked eye. Here, when the liquid crystal alignment film had excellent alignment characteristic to excellently arrange liquid crystals, the light was not passed by the upper and lower polarizing plates that were vertically attached to each other, and the liquid crystal alignment film was observed in dark without defects. A case where the above-described alignment characteristic was observed was marked with as 'good', and a case where a liquid crystal flow mark or light leakage such as a bright spot was observed was marked with 'defective', and these results were shown in Table 1.

(2) Evaluation of Liquid Crystal Alignment Stability

Liquid crystal alignment stability was evaluated by using the liquid crystal cell to which the polarizing plate was attached which was manufactured for the evaluation of the liquid crystal alignment characteristic (1).

Specifically, the liquid crystal cell to which the polarizing plate was attached was attached on a backlight of 7,000 cd/m$^2$, and the luminance in the black state was measured using PR-880 which is an equipment for measuring luminance. In addition, the liquid crystal cell was driven at room temperature for 24 hours at an AC voltage of 5V. Then, in a state where the voltage of the liquid crystal cell was turned off, the luminance in the black state was measured in the same manner as described above.

A luminance variation was calculated by dividing a difference between the initial luminance (L0) measured before driving the liquid crystal cell and the latter luminance (L1) measured after driving the liquid crystal cell by the initial luminance (L0), and multiplying the obtained value by 100. It means that as the calculated luminance variation is closer to 0%, the liquid crystal alignment stability is more excellent. A case where the luminance variation was less than 10% was marked with 'excellent', a case where the luminance variation was 10% or more to less than 20% was marked with 'normal', and a case where the luminance variation was 20% or more was marked with 'defective', and these results were shown in Table 1.

(3) Evaluation of Voltage Holding Ratio (VHR)

Liquid crystal cells for voltage holding ratio were manufactured by the following methods using the liquid crystal alignment agents prepared in Examples 1 to 7, Comparative Examples 1 to 3, and Reference Examples 1 to 4.

The liquid crystal alignment agent was applied onto each of upper and lower substrates for voltage holding ratio (VHR) in which the ITO electrode having a thickness of 60 nm and an area of 1×1 cm were patterned on a rectangular glass substrate having a size of 2.5 cm×2.7 cm, by using a spin coating method.

Subsequently, the substrates applied with the liquid crystal alignment agent were placed and dried on a hot plate at about 70° C. for 3 minutes to evaporate the solvent. In order to align the thus-obtained coating films, the respective coating films of the upper and lower plates were irradiated with 254 nm ultraviolet rays in an exposure amount of 1.0 J/cm$^2$ using an exposure machine to which a linear polarizer was attached. Then, the aligned upper and lower plates were fired and cured in an oven at 230° C. for 30 minutes to obtain a coating film having a film thickness of 0.1 µm. Then, a sealing agent impregnated with a ball spacer having a size of 4.5 µm was applied to the edges of the upper and lower plates except for a liquid crystal injection hole. Further, the alignment films were arranged so that alignment treatment directions of the upper and lower plates were parallel to each other while opposing each other, and then the upper and lower plates were bonded together and the sealing agent was UV and thermally cured, thereby manufacturing an empty cell. In addition, the liquid crystal was injected into the empty cell, and the injection hole was sealed with the sealing agent, thereby manufacturing a liquid crystal cell.

The voltage holding ratio (VHR), which is the electrical characteristic of the liquid crystal cell manufactured as described above, was measured by using TOYO 6254 equipment. The voltage holding ratio was measured under severe conditions of 5V, 60 Hz and 60° C. An ideal value of the voltage holding ratio is 100%. As a result of the measurement, a case where the voltage holding ratio was 85% or more was marked with 'good' and a case where the voltage holding ratio was less than 85% was marked with 'defective', and these results were shown in Table 1 below.

TABLE 1

| | First polymer (P) | Second polymer (Q) | Mixed weight ratio (P:Q) | Evaluation of liquid crystal alignment characteristics | Evaluation of alignment stability | Evaluation of voltage holding ratio |
|---|---|---|---|---|---|---|
| Example 1 | P-1 | Q-1 | 50:50 | Good | Good | Good |
| Example 2 | P-1 | Q-2 | 50:50 | Good | Good | Good |
| Example 3 | P-2 | Q-2 | 50:50 | Good | Good | Good |
| Example 4 | P-3 | Q-1 | 60:40 | Good | Good | Good |
| Example 5 | P-4 | Q-3 | 70:30 | Good | Good | Good |
| Example 6 | P-5 | Q-3 | 50:50 | Good | Good | Good |
| Example 7 | P-6 | Q-2 | 20:80 | Good | Good | Good |
| Comparative Example 1 | P-8 | Q-1 | 50:50 | Defective | Defective | Good |
| Comparative Example 2 | P-2 | — | 100:0 | Good | Good | Defective |
| Comparative Example 3 | — | Q-1 | 0:100 | Defective | Defective | Defective |
| Reference Example 1 | P-7 | Q-1 | 50:50 | — | — | — |
| Reference Example 2 | P-2 | Q-3 | 90:10 | Good | Good | Defective |
| Reference Example 3 | P-1 | Q-2 | 10:90 | Defective | Defective | Good |
| Reference Example 4 | P-9 | Q-3 | 50:50 | Defective | Defective | Good |

As shown in Table 1, the liquid crystal alignment films of Examples 1 to 7 in which the compositions for a liquid crystal alignment agent each including both the first polymer for a liquid crystal alignment agent and the second polymer for a liquid crystal alignment agent of the present invention were used were excellent in all of the liquid crystal alignment characteristic, the stability, and the voltage holding ratio. However, the liquid crystal alignment films of Comparative Examples 1 to 3 in which only one of the first polymer for a liquid crystal alignment agent and the second polymer for a liquid crystal alignment agent was used, or in which a polymer different from the first polymer for a liquid crystal alignment agent was used were defective in some or all of the above-described evaluation factors.

The invention claimed is:
1. A composition for a liquid crystal alignment agent comprising:
a first polymer for the liquid crystal alignment agent including a repeating unit represented by Chemical Formula 1 below, a repeating unit represented by Chemical Formula 2 below and a repeating unit represented by Chemical Formula 3 below, and a second polymer for the liquid crystal alignment agent consisting of a repeating unit represented by Chemical Formula 4 below,
wherein the repeating unit represented by Chemical Formula 4 below is different from the repeating unit represented by Chemical Formula 2 below and the repeating unit represented by Chemical Formula 3 below,
wherein the first polymer for the liquid crystal alignment agent includes 10 mol % to 74 mol % of the repeating unit represented by Chemical Formula 1 with respect to all of the repeating units represented by Chemical Formulae 1 to 3, and 11.9 mol % to 15.1 mol % of the repeating unit represented by Chemical Formula 2 with respect to all of the repeating units represented by Chemical Formulae 1 to 3,
wherein a weight ratio of the first polymer for the liquid crystal alignment agent and the second polymer for the liquid crystal alignment agent is 15:85 to 85:15:

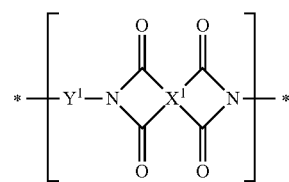
[Chemical Formula 1]

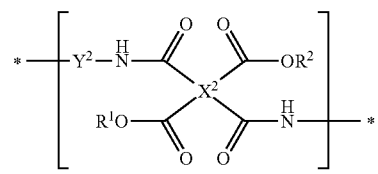
[Chemical Formula 2]

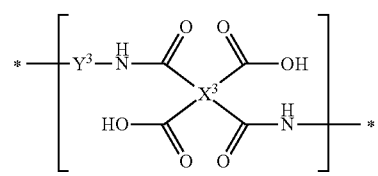
[Chemical Formula 3]

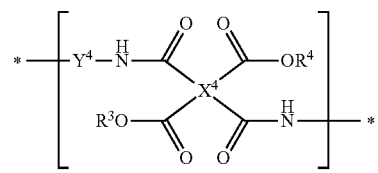
[Chemical Formula 4]

in Chemical Formulae 1 to 4, $R^1$ and $R^2$ are each independently hydrogen or a C1-C10 alkyl group, and not both of $R^1$ and $R^2$ are hydrogen, $R^3$ and $R^4$ are each independently hydrogen or a C1-C10 alkyl group, $X^1$ is a quadrivalent organic group represented by Chemical Formula 5 below,

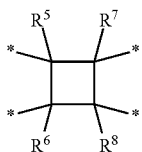

[Chemical Formula 5]

$R^5$ to $R^8$ are each independently hydrogen or a C1-C6 alkyl group,

X2 to X4 are each independently a quadrivalent organic group represented by Chemical Formula 7 below:

[Chemical Formula 7]

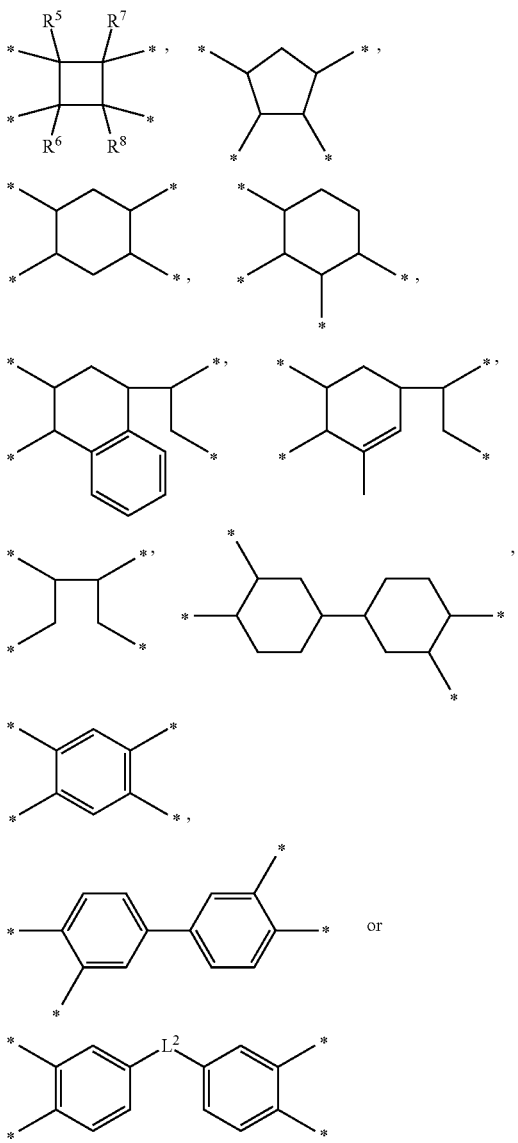

in the Chemical Formula 7, $R^5$ to $R^8$ are each independently hydrogen or a C1-C6 alkyl group, and $L^2$ is any one selected from the group consisting of a single bond, —O—, —CO—, —S—, —SO—, —SO$_2$—, —CR$^{11}$R$^{12}$—, —CONH—, —COO—, —(CH$_2$)$_z$—, —O(CH$_2$)$_z$O—, —COO—(CH$_2$)$_z$—OCO—, phenylene, and a combination thereof, wherein $R^{11}$ and $R^{12}$ are each independently hydrogen, a C1-C10 alkyl group or a C1-C10 fluoroalkyl group, and z is an integer of 1 to 10, $Y^1$ is a bivalent organic group represented by Chemical Formula 6 below:

[Chemical Formula 6]

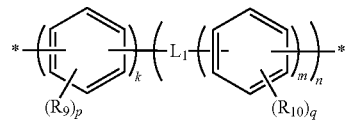

in the Chemical Formula 6, p and q are each independently an integer of 0, k is an integer of 1, and n is an integer of 0, and $Y^2$ to $Y^4$ are each independently a bivalent organic group represented by the Chemical Formula 6, wherein $R^9$ and $R^{10}$ are each independently halogen, a cyano group, a C1-C3 alkyl group, a C2-C3 alkenyl group, a C1-C3 alkoxy group, a C1-C3 fluoroalkyl group or a C1-C3 fluoroalkoxy group, p and q are each independently an integer of 0 to 4, $L_1$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O(CH$_2$)$_z$O—, —O(CH$_2$)$_z$—, —NH—, —NH(CH$_2$)$_z$—NH—, —NH(CH$_2$)$_z$O—, —OCH$_2$—C(CH$_3$)$_2$—CH$_2$O—, —OCO—(CH$_2$)$_z$—OCO— or —OCO—(CH$_2$)$_z$—COO—, z is an integer of 1 to 10, k and m are each independently an integer of 1 to 3, and n is an integer of 0 to 3.

2. A manufacturing method of a liquid crystal alignment film comprising:

applying the composition for a liquid crystal alignment agent of claim 1 to a substrate to form a coating film;

drying the coating film;

performing a light irradiation on the coating film immediately after the drying to conduct alignment treatment; and curing the coating film on which the alignment treatment is performed, by a heat treatment.

3. The manufacturing method of claim 2, wherein:

the composition for a liquid crystal alignment agent is obtained by dissolving or dispersing the first polymer for the liquid crystal alignment agent and the second polymer for the liquid crystal alignment agent in an organic solvent.

4. The manufacturing method of claim 2, wherein:

the drying of the coating film is performed at 50° C. to 150° C.

5. The manufacturing method of claim 2, wherein:

the light irradiation in the alignment treatment is performed with polarized ultraviolet ray having a wavelength of 150 nm to 450 nm.

6. The manufacturing method of claim 2, wherein:

the heat treatment temperature in the curing of the coating film is 150° C. to 300° C.

7. A liquid crystal alignment film manufactured by claim 2.

8. A liquid crystal display device comprising the liquid crystal alignment film of claim 7.

* * * * *